United States Patent [19]

Michelfelder et al.

[11] Patent Number: 4,903,755
[45] Date of Patent: * Feb. 27, 1990

[54] APPARATUS FOR PREHEATING COMBUSTION AIR, ACCOMPANIED BY SIMULTANEOUS REDUCTION OF $NO_x$ CONTAINED IN THE FLUE GASES

[75] Inventors: Sigfrid Michelfelder, Gummersbach; Stanislaw Michalak, Ratingen, both of Fed. Rep. of Germany

[73] Assignee: L. & C. Steinmüller GmbH, Gummersbach, Fed. Rep. of Germany

[*] Notice: The portion of the term of this patent subsequent to Jul. 29, 2003 has been disclaimed.

[21] Appl. No.: 185,861

[22] Filed: Apr. 25, 1988

Related U.S. Application Data

[62] Division of Ser. No. 882,245, Jul. 7, 1986, Pat. No. 4,738,826, which is a division of Ser. No. 657,394, Oct. 4, 1984, Pat. No. 4,602,673.

[30] Foreign Application Priority Data

Oct. 3, 1983 [DE] Fed. Rep. of Germany ....... 3335917

[51] Int. Cl.$^4$ .................. F28D 19/00; B01J 15/00
[52] U.S. Cl. .......................... 165/7; 165/10; 165/133; 422/200; 422/206; 423/239
[58] Field of Search ............... 165/7, 10, 133; 422/177, 200, 206; 423/239; 60/721

[56] References Cited

U.S. PATENT DOCUMENTS 4,602,673 7/1986 Michelfelder et al. ........... 165/7

FOREIGN PATENT DOCUMENTS 723303 3/1980 U.S.S.R. .................. 165/7
2085566 4/1982 United Kingdom ........ 165/104.16

Primary Examiner—Albert W. Davis, Jr.
Attorney, Agent, or Firm—Robert W. Becker & Associates

[57] ABSTRACT

An apparatus in the form of an air preheater for preheating air for combustion for a combustion process by acting upon the air with hot, $NO_x$-containing flue gases from the same or an independent combustion process. At the same time, the $NO_x$ contained in the flue gases is reduced. A regenerative or recuperative type air preheater is used, with thoses surfaces of the heat exchange elements which are exposed to the flue gas being provided with a coating which acts as a catalyst for the $NO_x$ reduction. The heat exchange elements are coated only in a region which as a flue gas temperature greater than the condensation temperature of the reaction products of the materials contained in the flue gas and of the added reducing agent. The catalyst coating is provided on individual heat exchange elements which are successively disposed in the direction of flow of the flue gas in such a way that the respective coatings are optimally adapted to the reaction conditions for the flue gas temperature which exists in that region.

3 Claims, 5 Drawing Sheets

APPARATUS FOR PREHEATING COMBUSTION AIR, ACCOMPANIED BY SIMULTANEOUS REDUCTION OF $NO_x$ CONTAINED IN THE FLUE GASES

This is a divisional application based on copending U.S. Pat. No. 882,245, which was filed July 7, 1986 and which is now U.S. Pat. No. 4,739,826 which in turn was a divisional application based on at that time copending U.S. Pat. No. 657,394, which was filed Oct. 3, 1984 and is now U.S. Pat. No. 4,602,673.

BACKGROUND OF THE INVENTION

1. Field of the Invention

The present invention relates to an apparatus in the form of an air preheater for preheating the air for combustion for a combustion process by acting upon the air with hot, $NO_x$-containing flue gases from the same or an independent combustion process; the $NO_x$ contained in the flue gases is simultaneously reduced.

So-called air preheaters are used to preheat the air for combustion for a combustion process. As a result of this preheating, there is achieved, among other things, advantages which relate to combustion and which result from higher combustion chamber temperatures, such as accelerated ignition and more complete combustion. Flue gas from the combustion process itself generally serves as the material flow which gives off heat for the combustion air which is to be heated up. However, it is also possible to use flue gas from an independent combustion process.

2. Description of Prior Art

A number of apparatuses for preheating the air for combustion are known. Such air preheaters include so-called recuperators and regenerators.

In a recuperative air preheater, the air is heated by the flue gas via heat transfer through solid walls. Preheaters of this type include, for example, plate or tube heat exchangers.

With regenerative air preheaters, the storage mass absorbs heat from the flue gas and later surrenders it to the air. For continuous operation, essentially two designs having cylindrical storage masses are encountered. One design has a rotating storage mass and stationary air and flue gas connections (Ljungstrom air preheater), and the other design has a stationary storage mass and a rotating air connection within the fixed flue gas connection which covers the entire storage mass (Rothemühle air preheater). In both types of embodiments, the heat storage masses are designed as stationary bundles of laminations. With another type of heat storage mass, separate movable heat storage bodies are used in place of the fixed bundle of laminations; such a design is disclosed, for example, in U.S. Pat. No. 4,310,046.

In large furnaces, in addition to other noxious substances, there is produced $NO_x$ which pollutes the environment to a great extent. With regard to reducing the $NO_x$ emissions, a distinction is made between primary and secondary measures. The primary measures undertake action within the combustion chamber. Thus, a reduction of the $NO_x$ formation is already achieved during the combustion process, for example by the use of burners which are developed especially for this purpose, or by feeding the air for combustion in stages.

The secondary measures undertake procedural action outside of the furnace or boiler. Such action includes flue gas treatment processes according to which a reducing agent, such as $NH_3$, is used in the presence of a catalyst, such as vanadium compounds on a titanium oxide base, with a reduction of $NO_x$ to molecular nitrogen and water vapor being effected. This process is carried out in a separate reactor which is provided for this purpose and is equipped with the catalyst. This reactor is generally disposed between the boiler unit and the air preheater. In many units, a high temperature electrostatic precipitator is disposed ahead of the reactor.

However, this known arrangement of the $NO_x$ reactor between the air preheater and the boiler unit has a number of drawbacks. On the one hand, there results a pressure loss of the flue gas as it flows through the catalyst bed. On the other hand, an appropriate amount of space has to be provided for this reactor. Furthermore, the support construction of the system has to be reinforced due to the weight of the $NO_x$ reactor. In addition, due to the dust content of the flue gases, the catalyzers have to be periodically cleaned, for example with soot blowers, which, of course, has a negative impact on the operating cost.

An object of the present invention is therefore to design an apparatus for reduction of the $NO_x$ from the flue gas while maintaining the effectiveness of the heretofore known reactors in such a way that the loss of pressure of the flue gas as well as the space required for the unit are minimized while at the same time reducing the energy requirement for the cleaning.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
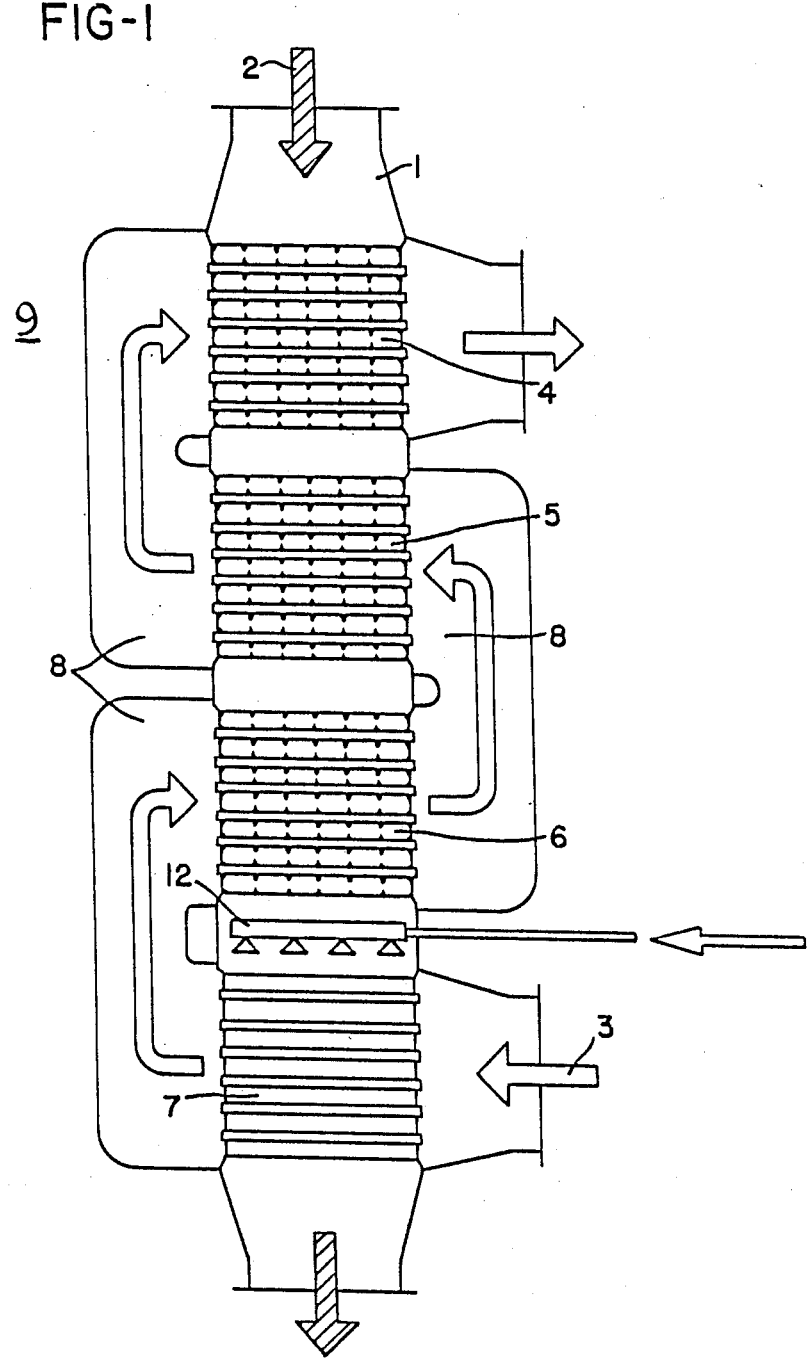
FIG. 1 schematically illustrates an air preheater in the form of a tube heat exchanger which operates according to the cross flow principle and is inventively provided with a catalyst coating on the heat exchange elements.

The apparatus of the present invention is characterized primarily by the use of a regenerative or recuperative type air preheater in which those surfaces of the heat exchange elements which are exposed to the flue gas are provided with a coating that acts as a catalyst for the $NO_x$ reduction.

To avoid the formation of deposits on the catalyst contact surfaces as a result of the flue gas, which is cooled off as it flows through the heat exchanger, falling below the condensation temperature, it is furthermore proposed pursuant to the present invention that the catalyst coating on the heat exchange elements be provided only in the region which has a flue gas temperature greater than the condensation temperature of the reaction products of the materials contained in the flue gas and of the added reducing agent.

Pursuant to another specific embodiment of the present invention, the air preheater that is provided with a catalyst coating on the heat exchange elements is designed for a flue gas exit temperature greater than the condensation temperature of the reaction products of the materials contained in the flue gas and of the added reducing agent, while connected downstream from this preheater is an air preheater having a self-cleaning heat storage mass which during operation is kept in a fluidized bed, and which comprises a plurality of separately movable individual elements.

Pursuant to yet another proposal of the present invention, individual heat exchange elements are provided one after the other in the direction of flow of the flue gas with a catalyst coating that is respectively optimally adapted to the reaction conditions for the flue gas temperature which is present in that region.

The advantages achieved with the present invention consist in that the space required for the system is considerably reduced due to the integration of the $NO_x$ reactor in the air preheater; likewise, the pressure losses which otherwise occur in an $NO_x$ reactor are avoided. By eliminating a separate housing for the catalyzers, simpler and hence more economical support constructions can be utilized. Since not only the catalyzers but also the heat exchange surfaces must be cleaned at certain time intervals, for example by means of soot blowers, only one such device is required for the apparatus of the present invention. A significant advantage of the present invention also is provided by coating the heat exchange elements in the downstream direction with different catalyst materials, the activity of which is respectively adapted to the optimum reaction conditions for the flue gas temperature which exists in this region. As a result, a high efficiency is achieved for the $NO_x$ reduction. Not only the catalyst but also the heat exchange elements are elements of the system which can wear out due to dust abrasion and corrosion, and must be periodically replaced. Since the heat exchange elements are inventively provided with a catalyst coating, with the apparatus of the present invention only one operation is required in order to effect such replacement.

DESCRIPTION OF PREFERRED EMBODIMENTS

Figure 2:
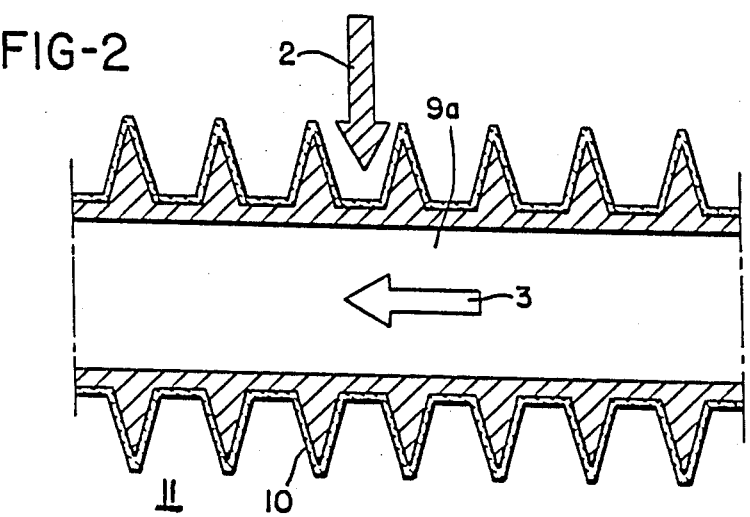
FIG. 2 is a detailed view of a portion of a heat exchange element in the form of a finned tube which is provided with a catalyst coating.

Referring now to the drawings in detail, the air preheater 1 illustrated in FIG. 1 is a tube heat exchanger; the flue gas 2 and the air 3 which is to be heated up are guided in a cross flow. The air preheater 1 is divided into four zones 4, 5, 6, and 7 which are connected with one another via guide channels 8 for the air. Only the heat exchange elements in the zones 4, 5, and 6 are provided with a catalyst coating. Since, in contrast to the situation which exists in a separate reduction reactor, the flue gas is cooled off as it flows through a heat exchanger, it is inventively proposed to select the catalyst material in the individual zones in such a way that the activity of this material is adapted to the flue gas temperature that exists in a given zone. In this way, a high rate of reduction is achieved. The heat exchange element for the zones 4 to 6 can, for example, be the finned tube 9a shown in FIG. 2. With this embodiment, a particularly large contact surface of the catalyst is provided. Due to the fact that relative to the material of the heat exchange element 9a, for example steel tubes 11 (FIG. 2), the catalyst coating or layer 10 has a considerably lower heat conductivity, there is possible with this embodiment to provide a compact air preheater due to the greater heat exchange surface for the flue gas.

Figure 3:
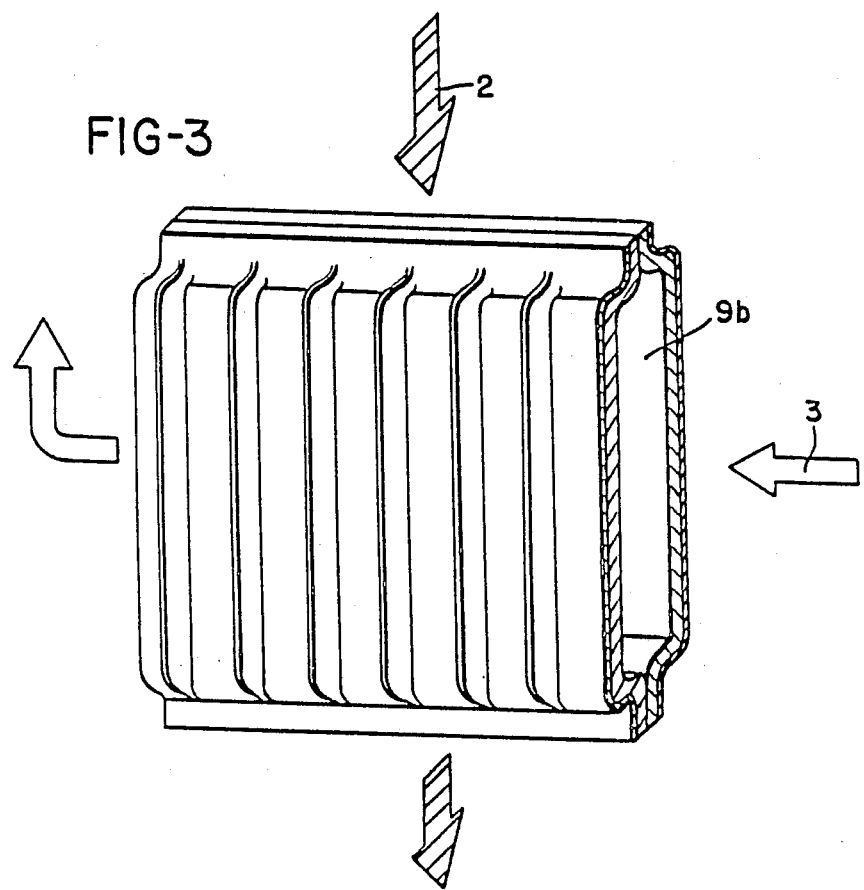
FIG. 3 is a detailed view of a portion of a heat exchange element in the form of a catalyst-coated finned plate for a plate air preheater.

In the embodiment illustrated in FIG. 1, the zone 7 in the heat exchanger is provided with smooth tubes that have no catalyst coating. The reason for this is that the flue gas 2, which cools off as it flows through the heat exchanger, passes in the zone 7 through a temperature range in which deposits could form on the heat exchange elements due to the condensation of reaction products from the materials contained in the flue gas and from the added reducing agent. Thus, for example, the $SO_3$ from the flue gas reacts with the $NH_3$ reducing agent to form ammonium sulfite, the condensation temperature of which is below approximately 250° C. In order from time to time to rid the heat exchange elements of these deposits, a soot blower 12 is provided. Soot blowers for cleaning the catalyst contact surfaces, for example, can be disposed at the inlet for the flue gas. In place of tubes as heat exchange elements, plates or so-called plate-fins can be used in the air preheater. Such a use does not make a difference in principle in the manner of functioning thereof relative to an air preheater which is provided with tubes. A particularly suitable plate-fin element 9b is illustrated in FIG. 3. As in the case of the heat exchange element of FIG. 2 here also an increased surface, a greater catalyst contact surface, and a greater heat exchange surface is produced for the flue gas.

Figure 4:
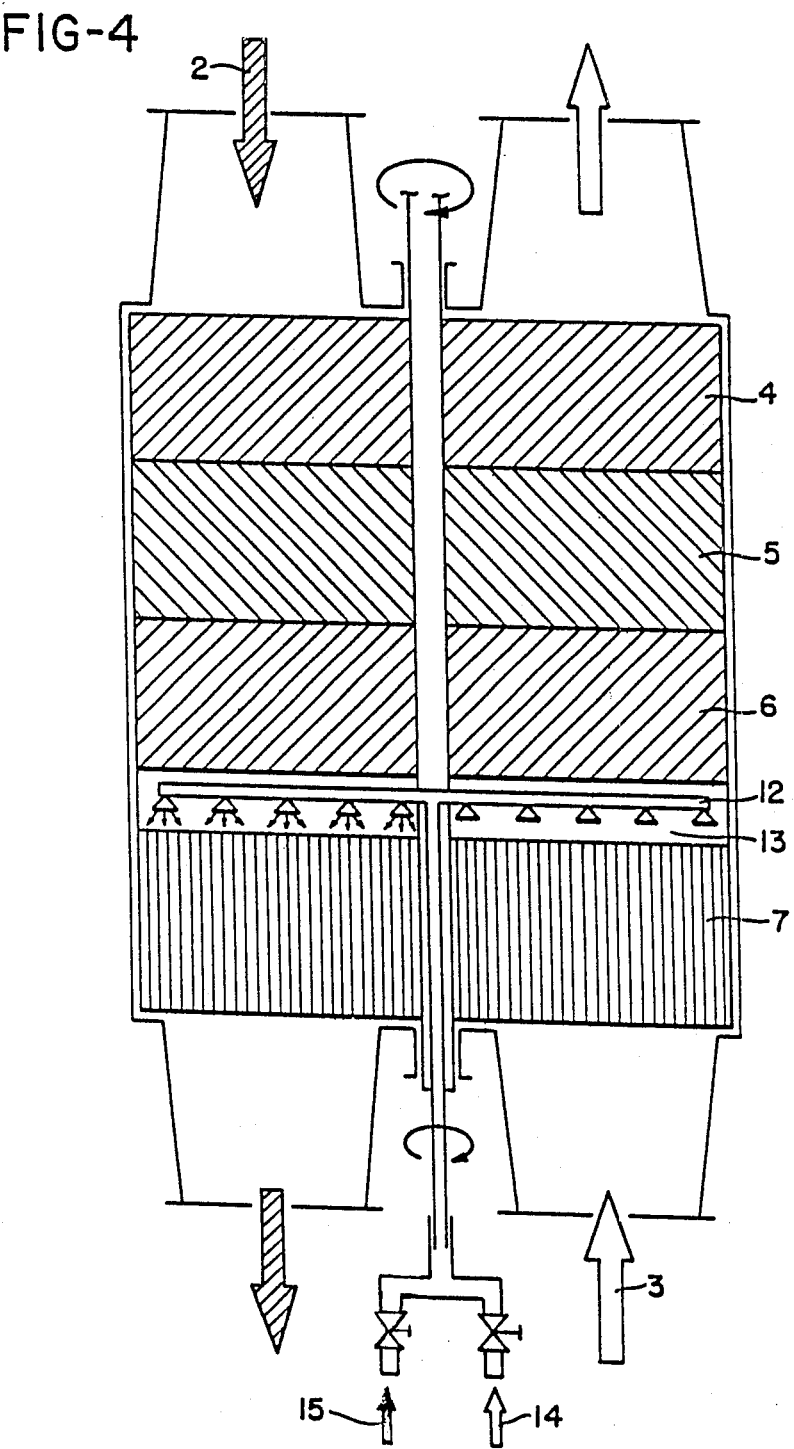
FIG. 4 is a cross-sectional view of a Ljungstrom-type air preheater which has a catalyst-coated heat storage mass.

FIG. 4 is a cross section through an air preheater of the so-called Ljungstrom type, which has a cylindrical storage mass that rotates during operation. In this case also, the storage mass is divided into several zones 4, 5, 6, and 7, with the storage mass in the lowermost zone 7 not being coated with catalyst material. As in the previous embodiment, the activity of the catalyst materials in the individual zones is adapted to the respective flue gas temperature in that zone, so that each layer or coating has optimum reaction conditions for the flue gas temperature that exists in that zone. In the embodiment of FIG. 4, a gap 13 is provided in the storage mass between the lowermost zone 7 and that zone 6 disposed thereabove; a cleaning device 12 is provided in the gap 13. With this cleaning device 12, cleaning can selectively be undertaken by means of compressed air 14 or water 15.

Figure 5:
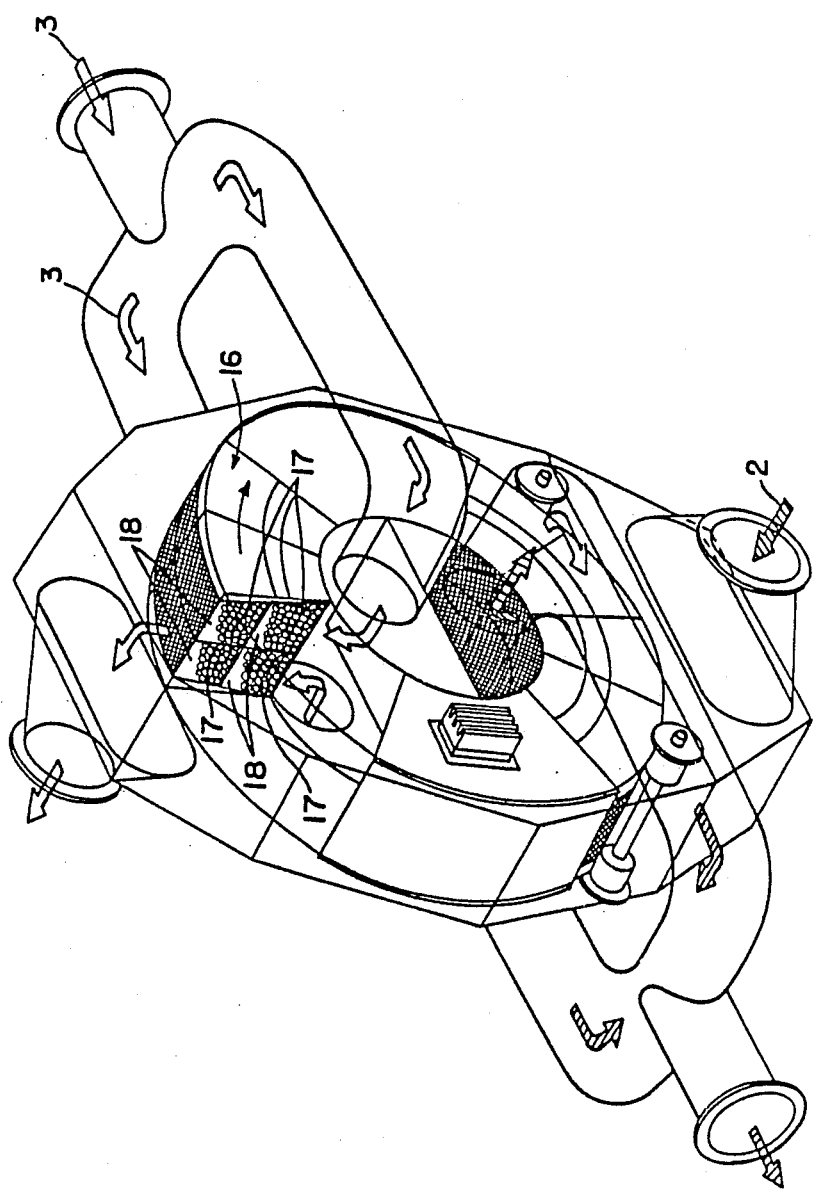
FIG. 5 shows a rotary air preheater having radial gas feed and a catalyst-coated heat storage mass in the form of individual elements.

The regenerative air preheater illustrated in FIG. 5 has a rotating drum 16 and radial gas feed; the heat storage mass comprises a plurality of movable individual elements 17 in the form of, for example, spheres, hollow spheres, and/or saddle-shaped bodies, which are similarly provided with a catalyst coating or layer. Pursuant to this embodiment, the drum 16 is divided in the radial direction into individual chambers 18, with the heat conductive elements 17 in the individual chambers 18 being provided with catalyst coatings that are respectively adapted to the flue gas temperature. With this type of air preheater, which has separate, movable individual elements 17 as the heat storage mass, it is not necessary to provide cleaning means, since these elements rid themselves of deposits due to the fact that they rub against one another, and due to their whirling movements.

Figure 6:
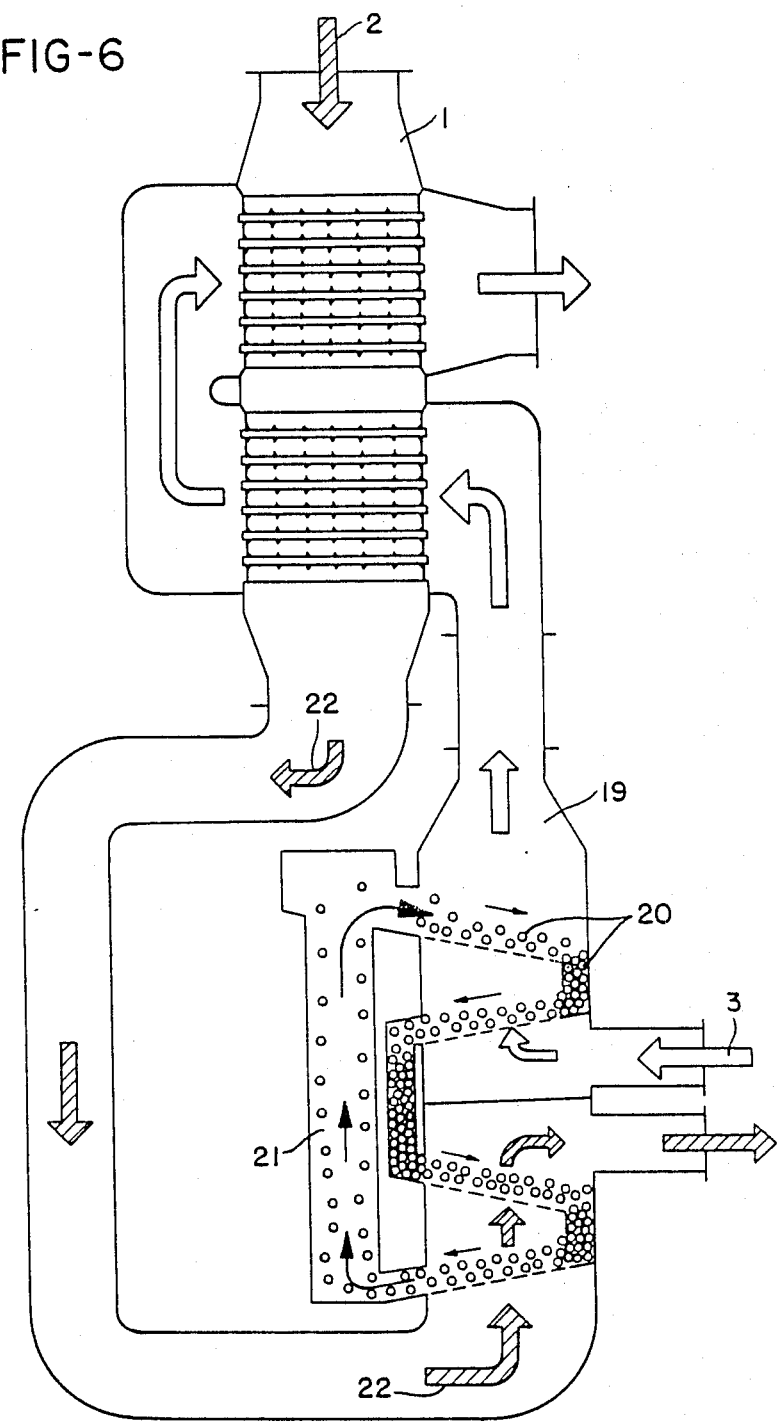
FIG. 6 shows a combination of the tube air preheater having catalyst-coated heat exchange elements, and a subsequently disposed air preheater having a self-cleaning heat storage mass.

Another possibility for continuously keeping the heat exchange surfaces free of deposits is shown in FIG. 6. In this embodiment, disposed one after the other are a tube or plate air preheater 1 of the type illustrated in FIG. 1, and an air preheater in the form of a column heat exchanger 19 having a storage mass comprising a plurality of separate movable elements 20 that are circulated by means of a transporting mechanism 21. Only the heat exchange elements 9 of the plate or tube heat exchanger 1 are provided with a catalyst coating. In order to avoid deposits on the catalyst contact surfaces, this air preheater 1 is designed in such a way that the temperature of the exiting flue gases 22 is still greater than the condensation temperature of the reaction products of the materials contained in the flue gas and of the added reducing agent. In the subsequent column heat exchanger 19, deposits are avoided by the fact that the heat storage elements 20 are continuously kept in fluidized bed due to the fact that the flue gases 22 and the combustion air 3 which is to be heated up flow in an upward direction. As a result, a self-cleaning effect of the subsequently arranged air preheater 19 is achieved.

The present invention is, of course, in no way restricted to the specific disclosure of the specification and drawings, but also encompasses any modifications within the scope of the appended claims.

What we claim is:

1. An apparatus for preheating air for combustion for a combustion process while simultaneously reducing the $NO_x$ content of hot flue gases utilized to effect said preheating, said apparatus comprising:

a revolving regenerative air heater that includes heat exchange elements having surfaces that are exposed to said hot flue gases, with said surfaces having a coating that acts as a catalyst for the reduction of $NO_x$, whereby said regenerative air heater is a revolving drum that is divided in a radial direction into individual chambers that contain said heat exchange elements, which are in the form of a heat storage mass comprised of a plurality of movable individual elements that are respectively provided with said catalyst coating.

2. An apparatus according to claim 1, in which respective ones of said coatings of said individual heat exchange elements are optimally adapted to reaction conditions for the flue gas temperature that exists in the vicinity of that coating.

3. An apparatus for preheating air for combustion for a combustion process while simultaneously reducing the $NO_x$ content of hot flue gases utilized to effect said preheating, said apparatus comprising:

a revolving regenerative air heater that includes heat exchange elements having surfaces that are exposed to said hot flue gases, with said surfaces having a coating that acts as a catalyst for the reduction of $NO_x$, whereby said regenerative air heater is a revolving drum that is divided in a radial direction into individual chambers that contain said heat exchange elements, which are in the form of a heat storage mass comprised of a plurality of movable individual elements that are respectively provided with said catalyst coating, with respective ones of said coatings of said individual heat exchange elements being optimally adapted to reaction conditions for the flue gas temperature that exists in the vicinity of that coating.

* * * * *

UNITED STATES PATENT AND TRADEMARK OFFICE
CERTIFICATE OF CORRECTION

PATENT NO. : 4,903,755
DATED : 27 February 1990
INVENTOR(S) : SIGFRID MICHELFELDER ET AL It is certified that error appears in the above-identified patent and that said Letters Patent is hereby corrected as shown below:

On the Title-Abstract Page:

[62] Division of Ser. No. 882,245, Jul. 7, 1986, Pat. No. 4,739,826, which is a division of Ser. No. 657,394, Oct. 3, 1984, Pat. No. 4,602,673.

Signed and Sealed this

Twenty-eighth Day of April, 1992

Attest:

HARRY F. MANBECK, JR.

*Attesting Officer*     *Commissioner of Patents and Trademarks*